United States Patent
Bae

(10) Patent No.: US 11,450,156 B2
(45) Date of Patent: Sep. 20, 2022

(54) DEVICE AND METHOD FOR CONTROLLING SOUND SIGNAL OF VEHICLE, AND DEVICE OF OUTPUTTING SOUND SIGNAL

(71) Applicant: Minjae Bae, Seoul (KR)

(72) Inventor: Minjae Bae, Seoul (KR)

( * ) Notice: Subject to any disclaimer, the term of this patent is extended or adjusted under 35 U.S.C. 154(b) by 307 days.

(21) Appl. No.: 16/784,260

(22) Filed: Feb. 7, 2020

(65) Prior Publication Data

US 2020/0258327 A1    Aug. 13, 2020

(30) Foreign Application Priority Data

Feb. 8, 2019  (KR) .................. 10-2019-0014678

(51) Int. Cl.
*G07C 5/08* (2006.01)
*B60Q 5/00* (2006.01)
*B60Q 9/00* (2006.01)
*G01C 21/20* (2006.01)

(52) U.S. Cl.
CPC ............. *G07C 5/0833* (2013.01); *B60Q 5/00* (2013.01); *B60Q 9/008* (2013.01); *G01C 21/20* (2013.01)

(58) Field of Classification Search
CPC ........ G07C 5/0833; B60Q 5/00; B60Q 9/008; B60Q 5/008; B60Q 2300/112; B60Q 2300/114; B60Q 2300/45; G01C 21/20; G01C 21/3697; G01S 13/865; G01S 13/931; G06V 10/255; G06V 20/56; G10K 15/02; B60K 35/00; B60R 11/0217; B60R 21/0134; B60W 30/08; B60W 40/02; B60W 40/105; B60W 50/14; B60W 2050/146; B60W 2420/42; B60W 2420/52; B60W 2420/54; B60W 2540/18; B60W 2554/00; B60W 2554/801; B60W 2556/45; B60Y 2200/91; B60Y 2200/92

See application file for complete search history.

(56) References Cited

U.S. PATENT DOCUMENTS

| | | | | |
|---|---|---|---|---|
| 5,515,026 A | * | 5/1996 | Ewert | B60Q 9/008 340/384.1 |
| 5,598,164 A | * | 1/1997 | Reppas | G01S 13/931 342/72 |
| 5,978,737 A | * | 11/1999 | Pawlowski | G01S 13/931 701/301 |
| 5,983,161 A | * | 11/1999 | Lemelson | G01S 19/11 340/436 |

(Continued)

FOREIGN PATENT DOCUMENTS

| | | |
|---|---|---|
| JP | 2011-051446 A | 9/2009 |
| JP | 2011-0255830 A | 6/2010 |

(Continued)

*Primary Examiner* — Richard M Camby

(57) ABSTRACT

An apparatus includes: a driving route calculator configured to obtain vehicle information about a vehicle and calculate a driving path of the vehicle; an object detector configured to detect an object near the vehicle or the driving path of the vehicle using one or more sensors mounted on the vehicle, and obtain object information on the object; and an acoustic signal processor configured to control a frequency and a volume of an acoustic signal based on the vehicle information and the object information, and transmit the acoustic signal to a speaker mounted on the vehicle.

20 Claims, 10 Drawing Sheets

(56) References Cited

U.S. PATENT DOCUMENTS

| | | | | |
|---|---|---|---|---|
| 6,226,389 | B1* | 5/2001 | Lemelson | G01S 13/867 |
| | | | | 382/104 |
| 2006/0287829 | A1* | 12/2006 | Pashko-Paschenko | ...................... |
| | | | | B60Q 9/005 |
| | | | | 340/436 |
| 2012/0053826 | A1* | 3/2012 | Slamka | G01S 15/93 |
| | | | | 701/301 |
| 2012/0212353 | A1* | 8/2012 | Fung | B60W 30/08 |
| | | | | 701/1 |

FOREIGN PATENT DOCUMENTS

| | | |
|---|---|---|
| JP | 2011-051446 A | 3/2011 |
| JP | 2011-255830 A | 12/2011 |
| KR | 10-1741669 B1 | 2/2016 |
| KR | 10-2018-0068045 A | 12/2016 |
| KR | 10-1741669 B1 | 5/2017 |
| KR | 10-2017-0069096 A | 6/2017 |
| KR | 10-2018-0068045 A | 6/2018 |

* cited by examiner

DEVICE AND METHOD FOR CONTROLLING SOUND SIGNAL OF VEHICLE, AND DEVICE OF OUTPUTTING SOUND SIGNAL

CROSS-REFERENCE TO RELATED APPLICATION(S)

This application claims priority under 35 USC § 119 to Korean Patent Application No. 10-2019-0014678, filed on Feb. 8, 2019 in the Korean Intellectual Property Office (KIPO), the disclosure of which is incorporated herein in its entirety by reference.

TECHNICAL FIELD

The present disclosure relates to a device and method for controlling sound signal of a vehicle, and a device of outputting a sound signal.

BACKGROUND

In modern society, cars are the most commonly used means of transportation. Recently, a trend is observed to shift focus of research and development from a vehicle driven by an internal combustion engine such as a gasoline engine or a diesel engine to a more environmentally friendly vehicle such as a hybrid vehicle that has both an internal combustion engine and an electric motor or an electric vehicle that has only an electric motor.

In a conventional vehicle using an internal combustion engine, pedestrians perceive that the vehicle approaches due to noise generated by the internal combustion engine and noise caused by road surface friction generated while driving. However, for an environmentally friendly vehicle such as an electric vehicle, there is an issue that pedestrians may not easily perceive an approach of a hybrid vehicle or an electric vehicle due to the quietness of the electric motor, thereby increasing a risk of an accident.

SUMMARY

According to one embodiment of the present disclosure, a vehicle sound control apparatus outputs a sound to allow a pedestrian to recognize an approach of a vehicle by controlling a frequency and a volume of a sound signal.

According to an embodiment, an apparatus includes: a driving route calculator configured to obtain vehicle information about a vehicle and calculate a driving path of the vehicle; an object detector configured to detect an object near the vehicle or the driving path of the vehicle using one or more sensors mounted on the vehicle, and obtain object information on the object; and an acoustic signal processor configured to control a frequency and a volume of an acoustic signal based on the vehicle information and the object information, and transmit the acoustic signal to a speaker mounted on the vehicle.

According to another embodiment, a method includes: obtaining vehicle information about a vehicle and calculate a driving path of the vehicle; detecting one or more objects within a predetermined range from the vehicle or the driving path of the vehicle using one or more sensors mounted on the vehicle; obtaining object information on each of the one or more objects; controlling a frequency and a volume of an acoustic signal based on the vehicle information and the object information; and transmitting the acoustic signal to a speaker mounted on the vehicle.

As described above, according to the present disclosure, a pedestrian be recognized faster of approaching the vehicle by detecting an object around the vehicle's driving path and controlling and outputting the acoustic signal based on the detected object and the vehicle information.

DETAILED DESCRIPTION

Reference will now be made in detail to embodiments, examples of which are illustrated in the accompanying drawings.

In describing the components of the present disclosure, terms such as the first, the second, A, B, (a), and (b) may be used. These terms are only for distinguishing some components from other components, and the nature, order, order, etc. of the components are not limited by the terms. If a component is described as being "connected," "coupled," or "connected" to another component, that component may be directly connected to or connected to that other component, but there may be another configuration between each component. It is to be understood that the elements may be "connected," "coupled," or "connected".

The vehicle in the present specification may refer to an automobile, a motorcycle, or the like. In addition, the vehicle may include a conventional vehicle including an internal combustion engine as a power source, a hybrid vehicle having an engine and an electric motor as a power source, and an electric vehicle having an electric motor as a power source.

In the following description, the term "front" refers to the forward driving direction of the vehicle, and the term "rear" refers to the backward driving direction of the vehicle. The left side of the vehicle may refer to the left side of the forward driving direction of the vehicle, and the right side of the vehicle refers to the right side of the forward driving direction of the vehicle. In addition, the right side or left side of the vehicle may refer to the left side or the right side based on the backward driving direction of the vehicle.

In the present specification, the interior of the vehicle refers to an interior space of the vehicle occupied by a driver of the vehicle. The exterior of the vehicle refers to a space other than the interior space of the vehicle occupied by the driver of the vehicle, for example, an engine room of the vehicle. In some embodiment, interior space may encompass an exterior space of the vehicle body.

Figure 1:
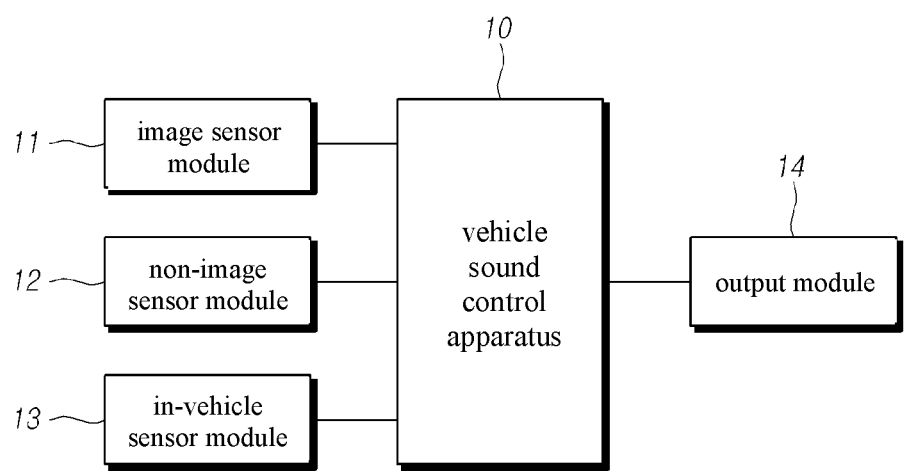
FIG. 1 is a block diagram of a vehicle including a vehicle sound control apparatus.

FIG. 1 is a part of a block diagram of a vehicle including a vehicle sound control apparatus according to an embodiment of the present disclosure. The vehicle may include an image sensor module 11, a non-image sensor module 12, a vehicle sound control apparatus 10, an in-vehicle sensor module 13, and an output module 14.

The vehicle sound control apparatus 10 controls an output of an acoustic signal to the outside or the inside of a vehicle, and a detailed description of the vehicle sound control apparatus 10 will be described later with reference to FIG. 2 and the following drawings.

Each of the image sensor module 11 and the non-image sensor module 12 of the present disclosure may include a sensor for capturing data having information about the inside or outside of the vehicle and a processor for processing the same. The in-vehicle sensor module 13 may include a sensor capable of sensing internal data of the vehicle and a processor for processing the same. The output module 14 may out a signal processed in a processor of each the image sensor module 11, the non-image sensor module 12 and/or a signal processed in a vehicle sound control apparatus 10 to the inside or outside of the vehicle.

Figure 3:
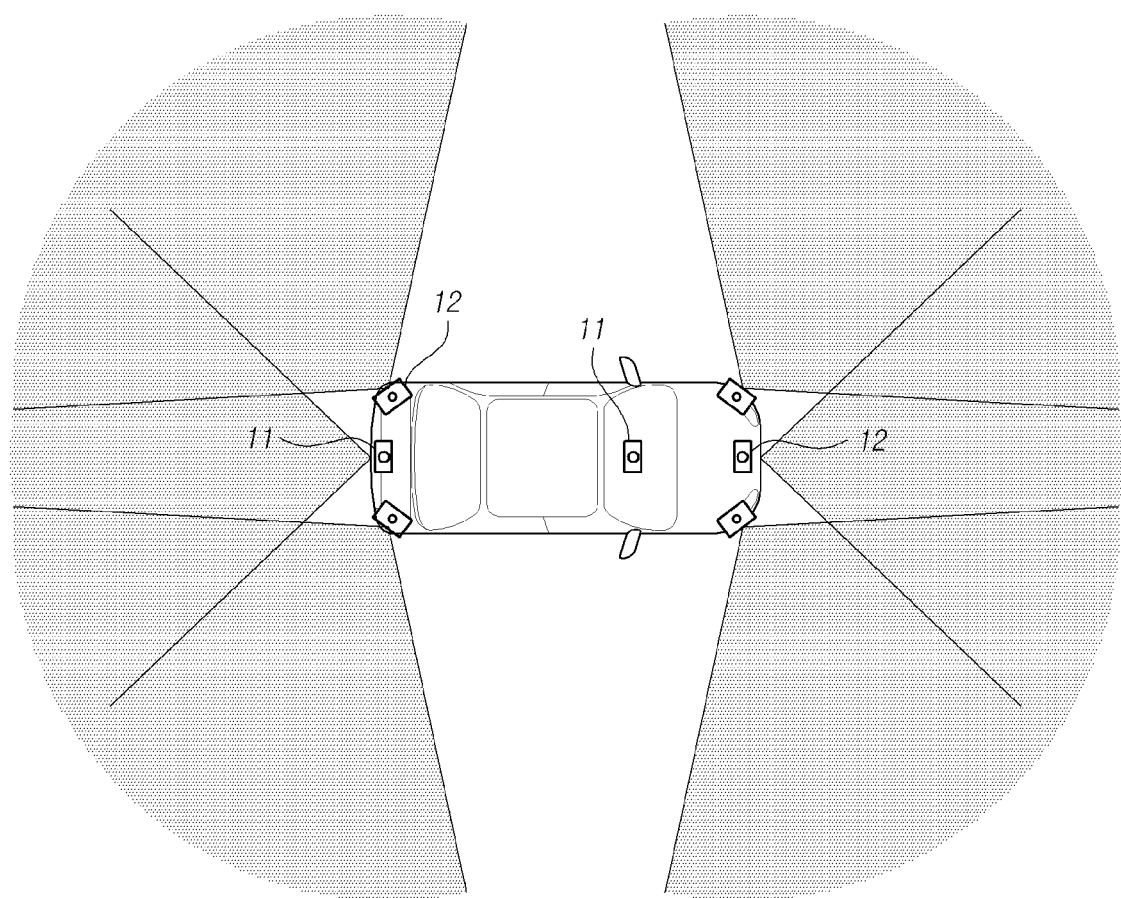
FIG. 3 is a view for explaining a sensor created in a vehicle according to an embodiment of the present disclosure.

FIG. 3 is a view for explaining a sensor created in a vehicle according to an embodiment of the present disclosure. FIG. 3 illustrates an example of a position at which one or more of the image sensor module 11 and the non-image sensor module 12 are mounted to a vehicle. However, the position of each sensor module shown in FIG. 3 corresponds to one of several embodiments, and the position of the sensor module of the present disclosure is not limited to the example shown in FIG. 3. For example, some of the sensors may be placed to sense data inside and outside of the vehicle. It can be mounted on or coupled to different parts of the vehicle.

The image sensor module 11 of the present disclosure may include an image sensor configured to have a field of view of the inside or outside of the vehicle and capture image data and a processor to process the captured image data. Examples of the image sensor module 11 include, but are not limited to, a camera sensor and a Light Detection and Ranging (LIDAR) sensor. The image sensor module 11 may be provided in one or more types.

For example, the image sensor may be disposed in the vehicle to have a view of the inside or the outside of the vehicle. At least one image sensor may be mounted to each part of the vehicle to have a view of the front, side, or rear of the vehicle. For example, referring to FIG. 3, the image sensor module 11 may be installed at the front and the rear of the vehicle, respectively, to collect image information about the front and the rear of the vehicle. The image information captured by the image sensor includes image data. Hereinafter, the image information captured from the image sensor in the present disclosure refers to image data captured from the image sensor unless explicitly stated otherwise.

Image data captured by the image sensor can be processed in the processor of the image sensor module 11. The processor may be operable to process image data captured by the image sensor of the image sensor module 11.

For example, the captured image data may be processed by a processor included in a camera module. As another example, the image data may be processed by the vehicle sound control apparatus 10 or another processor. The processor can process the image data captured by the image sensor into high quality images through various signal processing/enhancing operations. In addition, the processor may process image data to perform operations such as target detection, distance measurement, and target classification.

In one embodiment, the image sensor module 11 may include a LIDAR. The LIDAR may include a laser transmitter, a receiver, and a processor. The LIDAR may employs a time of flight (TOF) method or a phase-shift method.

The LIDAR may detect an object based on the transmitted laser, and detect the distance and relative speed with the detected object. When the object is a stationary object (for example, a roadside street, a street lamp, a traffic light, a traffic sign, etc.), the LIDAR may detect a traveling speed of the vehicle based on a time of flight (TOF) by the detected object.

Meanwhile, the non-image sensor module 12 of the present disclosure refers to another sensor module different from the image sensor module 11 that captures an image. For example, the non-image sensor module 12 may be mounted on (or coupled to) various parts of the vehicle and have a sensing area for the inside or outside of the vehicle to capture sensing data. Examples of the non-image sensor module 12 include a radar sensor and an ultrasonic sensor. The non-image sensor module 12 may be provided in one or more types.

Radar sensors or radar systems used in the present disclosure may include at least one radar sensor. For example, referring to FIG. 3, the non-image sensor module 12 includes a front sensing radar sensor mounted on the front of the vehicle, a rear radar sensor mounted on the rear of the vehicle, and a plurality of lateral sensing radar sensors mounted on each side of the vehicle. It may include one or more front lateral or rear lateral sensing radar sensors. Such a radar sensor or a radar system may analyze a transmission signal and a reception signal to process data and detect information about an object, and may include an electronic control unit (ECU) or a processor therefor. Data transmission or signal communication from the radar sensor to the ECU may use a communication link, such as an appropriate in-vehicle network bus.

Such a radar sensor includes at least one transmitting antenna for transmitting a radar signal and at least one receiving antenna for receiving a reflected signal reflected from an object.

The radar sensor according to an exemplary embodiment may adopt a multi-dimensional antenna array and a multiple-input multiple-output (MIMO) signal transmission to form a virtual antenna opening larger than an actual antenna aperture. For example, two-dimensional antenna arrays are used to achieve horizontal and vertical angle accuracy and resolution. With a two-dimensional antenna array, signals are transmitted and received by two separate scans (time-multiplexed) horizontally and vertically, and MIMO can be used separately from two-dimensional radar horizontal and vertical scans (e.g., time-multiplexed).

In a MIMO system, each transmitting antenna may transmit a signal having independent waveforms that are distinguished from each other. That is, each transmitting antenna transmits a signal of an independent waveform that is distinct from the other transmitting antennas, and each receiving antenna can determine from which transmitting antenna the reflected signal reflected from the object is transmitted due to the different waveforms of the transmitted signals.

In one embodiment, the non-image sensor module 12 may include an ultrasonic sensor. The ultrasonic sensor may include an ultrasonic transmitter, a receiver, and a processor. The ultrasonic sensor may detect an object based on transmitted ultrasonic waves, and detect a distance and a relative speed of the detected object. When the object is a stationary object (for example, a roadside street, a street light, a traffic light, a traffic sign, etc.), the ultrasonic sensor may detect a traveling speed of the vehicle based on a time of flight (TOF) by the detected object.

The in-vehicle sensor module 13 refers to a sensor for sensing in-vehicle information. For example, the in-vehicle sensor module 13 may include a steering angle sensor for sensing a steering angle, a vehicle speed sensor, an acceleration sensor, a vehicle motion sensor for sensing a vehicle movement, a vehicle altitude sensor, and a Global Positioning System (GPS) for detecting a vehicle position, and the like. For example, when the vehicle utilizes the GPS, the vehicle may acquire the position of the vehicle using a signal transmitted from GPS satellites. In addition, the in-vehicle sensor module 13 may generally refer to a collection of sensors for sensing various data in the vehicle.

The output module 14 may include a speaker for outputting a sound signal that is received from the vehicle sound control apparatus 10. The output module 14 may include, but not limited to, a vibration device of a steering wheel for providing a notification to a driver in the vehicle, a vibration device of a driver seat, a display device for the vehicle, and the like. In addition, the output module 14 may refer to a collection of various output devices for outputting a signal generated from the vehicle.

The output module 14 may include an output device such as a display device, a steering wheel vibration device, a seat vibration device, and the like. The output module 14 may be installed or mounted inside the vehicle to provide a notification to a driver. For example, the output module 14 may include an acoustic speaker installed at a location capable of providing a notification, a panel speaker for outputting sound using vibration of the panel, a sonic wave output device, and the like. Each output device that may be included in the output module 14 may be mounted at or close to a location of at least one of the image sensor module 11, the non-image sensor module 12, and the in-vehicle sensor module 13 of the vehicle, or maybe installed at different locations.

The vehicle of the present disclosure receives and processes image data captured from the image sensor module 11 and/or sensing data captured from the non-image sensor module 12, and performs data link or communication with other modules (not shown) provided in the vehicle. The vehicle may include an integrated processor configured to transmit and receive data processed over the link. For example, the vehicle may be operable to control one or more of various driver assistance systems (DAS) used in the vehicle using the processor. For example, the vehicle may utilize the processor to utilize and control various driver assistance systems including a blind spot detection (BSD) system, a lane keeping assist system (LKAS), an adaptive smart cruise control (ASCC) system, a lane departure warning system (LDWS), a lane change assistance system (LCAS), and a parking assistance system (PAS). The terms and names of the driver assistance system described herein are disclosed by way of example and not limitation. In addition, the vehicle may include an autonomous driving module for autonomous driving. Alternatively, the vehicle may control the autonomous driving module to perform autonomous driving by controlling individual system modules using the integrated processor.

In the following, in order to more clearly describe the exemplary embodiments according to the present disclosure, the above-described terms may be modified and described. In addition, the vehicle described in FIG. 1 is described by way of example, and in the following, the configuration of the vehicle and may be modified, added, or omitted in order to more clearly describe the present invention.

Figure 2:
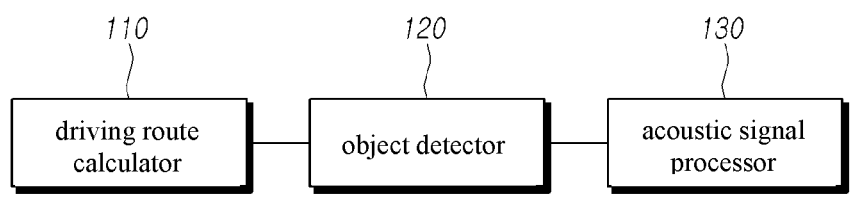
FIG. 2 is a block diagram of a vehicle sound control apparatus according to an embodiment of the present disclosure.

FIG. 2 is a block diagram of a vehicle sound control apparatus according to an embodiment of the present disclosure.

Referring to FIG. 2, the vehicle sound control apparatus 10 includes a driving route calculator 110, an object detector 120, and an acoustic signal processor 130. The vehicle sound control apparatus 10 may be mounted on or coupled to the vehicle. The driving route calculator 110 calculates a driving route of the vehicle. The object detector 120 detects an object near a driving path of the vehicle using one or more sensors and acquires information on the detected object based on the information about the vehicle. The acoustic signal processor 130 controls a frequency and a volume of an output sound signal and transmits the sound signal to one or more speakers mounted on the vehicle.

The driving route calculator 110 obtains information about the vehicle to calculate a driving route of the vehicle. As described above, one or more speakers may be mounted at various positions of the vehicle, such as the front, rear, and lateral sides of the vehicle.

In one embodiment, the driving route calculation unit 110 may receive information about the vehicle from an internal sensor of the vehicle. The received information about the vehicle may include at least one of a speed, an acceleration, a position of the vehicle, and a rotation angle of the steering wheel. For example, the driving route calculator 110 may receive the speed information of the vehicle from a vehicle speed sensor among the internal sensors of the vehicle, rotation angle information of the steering wheel from a steering angle sensor, and location information of the vehicle from a GPS sensor included in the in-vehicle sensor module 13 or from an infrastructure server (e.g., a traffic monitoring system) monitoring a road where the vehicle is.

The driving route calculator 110 may calculate a driving route of the vehicle using the information about the vehicle received from the internal sensor of the vehicle. For example, the driving route calculator 110 may calculate the driving route of the vehicle using the speed information of the vehicle, the acceleration of the vehicle, and/or the rotation angle acceleration information of the steering wheel.

In another example, the driving route calculation unit 110 receives at least one of the above-discussed information and/or map information about a road for the vehicle from a navigation module included in or connected to the vehicle or the infrastructure server. The driving route calculation unit 110 can more accurately calculate the driving route of the vehicle using these information. In addition, the driving route calculator 110 may transmit the calculated driving route of the vehicle to a display unit inside the vehicle to display the driving route of the vehicle to the driver.

The object detector 120 may sense an object around the driving route (hereinafter also referred to as a driving path) of the vehicle by using one or more sensors mounted on the vehicle and obtain information of the detected object. The sensors mounted on the vehicle may include the image sensor module 11 and/or the non-image sensor module 12 of FIG. 1.

In one embodiment, based on the image data captured from the image sensor module 11 mounted on the vehicle and/or the sensing data captured from the non-image sensor module 12 mounted on the vehicle, the object detector 120 can determine the distance between the object and the vehicle. The information of the object may include at least one of the speed, shape, size, and the relative position of the object. The distance between the object and the vehicle indicates the minimum distance between the object and the vehicle, for example a straight-line distance. The relative position of the object may include a position difference between objects, or may include a distance or a position spaced between the object and the driving path of the vehicle. The spaced distance between the object and the driving path of the vehicle may be measured in a straight line perpendicular to the travel path of the vehicle, and it may be the minimum distance spaced from the travel path of the vehicle to the object.

For example, the object detector 120 may process the image data captured by the image sensor module 11 to obtain information about the shape or size of the object. Alternatively, the object detector 120 may process the sensing data captured by the non-image sensor module 12 to obtain information about the distance between the object and the vehicle, the speed of the object, and/or the relative position between the objects.

Furthermore, the object detector 120 may combine the image data captured by the image sensor module 11 and the sensing data captured by the non-image sensor module 12 and determine the distance between the object and the vehicle, the speed of the object, the shape of the object, the size of the object, and the driving path of the vehicle. At least one of relative positions of an object may be acquired as a reference.

The information on the object that can be detected by the object detector 120 is not limited thereto and can include various information that may be extracted from information captured by the image sensor module 11 and/or the non-image sensor module 12.

The object detector 120 may select one or more primary target objects among objects detected around a driving path of the vehicle based on the information about the objects, and determine a rank (e.g., priority) of each primary target object.

In one embodiment, an object that is within a predetermined distance from the front of the vehicle, for example, the position or relative position of the object and/or the distance from the traveling path of the vehicle may be selected as the primary target object. In addition, the object detector 120 may rank the selected primary target object based on information on the object.

In one embodiment, the object detector 120 may assign the priority of the objects based on the distance of the object from the vehicle and the relative position of the driving path of the vehicle. For example, the object detector 120 may first calculate a relative distance of the object with respect to the driving path of the vehicle and assign the priority of the object based on the calculated relative distance of the object. When the relative distance of the object to the driving path of the vehicle is the same, the object detector 120 may further use the distance between the object and the vehicle. As another example, the object detector 120 determines the priority between the objects by using the distance between the object and the vehicle preferentially. In one embodiment, the object detector 120 may determine the type of the object based on the information on the object and/or the information on the vehicle and select the primary target object based on the object type. For example, the object detector 120 may classify the type of object based on the shape and/or size.

In an embodiment, the object detector 120 selects an object excluding those having a certain shape or size based on the information of the object and classified the selected object as a primary target object. The relative positions of the respective target objects on or near the driving route of the vehicle may be compared and ranked in the order of proximity to the driving route, and the primary target object having the highest priority may be selected as a final target object.

In detail, the object detector 120 may process the image data received from the image sensor module 11, extract the shape of the object, and compare the extracted shape of the object with a predetermined shape of previously stored objects. The object detector 120 may quantitatively calculate the similarity between the shape of the extracted object and a predetermined shape of a previously stored object, and select an object as a primary target object based on the similarity. For example, the object detector 120 stores a vehicle shape as a previously-stored object and extracts the shape of the object by processing image data received from the image sensor module 11. Based on the similarity between the shape of the extracted object in comparison with the previously stored vehicle shape, for example, when the shape of the extracted object has a similarity to that of the vehicle within a predetermine range, the object is selected as a primary target object. The predetermined shape of the object stored in advance and compared may include not only the form of a vehicle but also a form of a pedestrian, a bicyclist, a motorcyclist, etc.

Alternatively, the object detector 120 may process the image data received from the image sensor module 11 to extract the shape of the object, calculate the similarity between the shape of the extracted object and a predetermined shape of various objects stored in advance. For example, the object detector 120 pre-stores a shape of a human or an animal, calculates a similarity between the shape of the object and the pre-stored shape, and based on the similarity, the object detector 120 selects the object as a primary target object.

In addition, the object detector 120 may process the image data received from the image sensor module 11 to extract a size of the object, and compare the size of the extracted object with a predetermined size. For example, when the size of the extracted object is smaller than a predetermined size, the object detector 120 may select the object as a primary target object.

Alternatively, the object detector 120 may process the image data received from the image sensor module 11 to extract the shape and size of the object, and may select an object as a primary target object based on the extracted shape and size of the object as a whole.

In an embodiment, the object detector 120 may object classification based on machine learning. The object detector 120 may recognize an object that is pre-learned by machine learning from the image data received from the image sensor module 11, and extract information about the object based on the recognized object's attributes.

Machine learning allows computers to learn and solve problems on their own without having a human interaction to enter a specific instruction, or direct a logic. In particular, deep learning is based on Artificial Neural Networks (ANN) for constructing artificial intelligence (AI), which mimics humans' way of thinking. The computers can learn by itself based on the deep learning without human's teaching. The artificial neural network (ANN may be implemented in software, hardware, firmware and/or other means. For example, the ANN can include a number of neural processing elements, often referred to as nodes that are implemented with any suitable digital logic, including not only special-purpose neural network integrated circuit chips and other hardware devices but also general-purpose computers programmed with neural network software.

The object detector 120 may include an artificial neural network (ANN) in the form of software or hardware to extract attributes of an object. For example, the artificial neural network may extract feature information corresponding to each level by using a learned layer corresponding to each level. The artificial neural network may abstract the object sequentially to recognize the object using the highest level of feature information. The object detector 120 may include a deep neural network (DNN) such as a convolutional neural network (CNN), a recurrent neural network (RNN), a deep belief network (DBN), and the like that have been learned by deep learning. CNN is a structure commonly used in the field of object recognition. It is based on the assumption that when a person recognizes an object, it extracts the basic features of the object and performs complex calculations in the person's brain to recognize the object based on the result. It is based on a model that simulates brain function. The RNN is an effective structure for processing time-series data that changes with time, and may form an artificial neural network by stacking layers. DBN is a deep learning structure that consists of a multi-layered Restricted Boltzman Machine (RBM), which is another form of a deep learning technique. By repeating RBM (Restricted Boltzman Machine) learning, if a certain number of layers is formed, a deep belief network (DBN) having a corresponding number of layers can be configured.

The object detector 120 learns using a learning technique such as machine learning, classifies image data received from the image sensor module 11 based on data previously learned by machine learning, determines attributes of objects, and classifies the types of objects. The object detector 120 may select a certain type of objects as a primary target object based on their attributes as discussed above.

Thereafter, the object detector 120 may calculate a relative position on the driving route of the vehicle of each of the selected primary target objects, compare the respective position of the position, and rank the driving positions in the order of proximity to the driving route. The object detector 120 may select the primary target object closest to the driving route as a final target object.

According to an embodiment, when there is a plurality of primary target objects closest to the driving path, the object detector 120 may select a primary target object that is closest to the vehicle as a final target object.

The acoustic signal processor 130 may control a frequency and a volume of the acoustic signal based on the information about the vehicle and the information about the object and transmit the acoustic signal to one or more speakers mounted in the vehicle. Each speaker mounted in the vehicle may include a device for outputting sound by converting an electrical signal into vibration of a diaphragm, or a device for outputting sound by vibrating a display panel such as a crystal sound OLED or a device for outputting a sonic wave. Furthermore, a plurality of speakers may be mounted on the vehicle, sound signals may out output using the speakers. According to one embodiment, the acoustic signal may include a virtual engine acoustic signal. The virtual engine sound signal is an acoustic signal similar to engine noise or driving sound of a vehicle. The virtual engine sound signal that is output through a speaker mounted on the vehicle, pedestrians or other drivers nearby can hear the virtual engine sound and quickly recognize that the vehicle is approaching in their your direction.

In one embodiment, the acoustic signal processor 130 may control a frequency and a volume of the output sound signal based on the speed information of the vehicle included in the information about the vehicle and the speed information of the object included in the information about the object according to the distance information between the vehicle and the object.

In an embodiment, the acoustic signal processor 130 may calculate the frequency and the volume of the sound signal according to the Doppler effect based on the speed information of the vehicle and the speed information of the object and calculate the frequency and the volume of the calculated sound signal. The frequency and the volume of the sound signal may be determined by applying weights according to the distance information between the vehicle and the object.

The weights applied to the frequency and the volume of the sound signal according to the distance information between the vehicle and the object may be stored in a table, and the acoustic signal processor 130 may determine the weight corresponding to the distance information between the vehicle and the object based on a corresponding entry in the table.

For example, the acoustic signal processor 130 determines the speed of the vehicle from the information about the vehicle and the speed of the object from the information about the object. The acoustic signal processor 130 may calculate a frequency and a volume of the sound signal according to the Doppler effect based on the speed of the vehicle and the speed of the object.

The acoustic signal processor 130 may look up a table to determine weights according to the distance between the vehicle and the object, apply the weights according to the distance between the vehicle and the object to the calculated frequency and volume of the sound signal, and outputs the sound signal having the final frequency and volume.

In one embodiment, a greater weight is applied to the frequency and the volume of the acoustic signal as the distance between the vehicle and the object is closer, or the relative position with respect to the vehicle's travel path is closer to the vehicle's travel path. For example, the closer the position of the object is to the vehicle, the greater the weight applied to the frequency and the volume of the acoustic signal, and the closer the position of the object to the vehicle's travel path is, the greater the weight applied to the frequency and the volume of the acoustic signal.

In one embodiment, the weights applied to the frequency and the volume of the acoustic signal may be varied based on a distance from the vehicle or a distance away from the vehicle's travel path. For example, as the distance from the vehicle or the distance away from the driving path of the vehicle becomes greater, a smaller weight may be applied to the frequency and the volume of the sound signal.

As another example, the object detector 120 may divide zones based on a distance from the vehicle or a distance away from the travel path of the vehicle, and the weight may be gradually lowered in the zones based on the distance from the vehicle or the distance away from the travel path of the vehicle.

In one embodiment, the acoustic signal processor 130 may beamform the sound signal to the object by using the position information of each object included in the information about the object. Beamforming may adjust the direction or sensitivity of a sound radiation pattern using an arrangement of a transmitting device and/or a receiving device, or superimpose signals to strengthen the signal. The one or more speakers mounted on the vehicle may be directional speakers that can apply the directionality of the sound signal and may output an acoustic signal in each beamforming direction according to the directivity of each speaker. The beamforming may be classified into fixed beamforming and adaptive beamforming based on the output information.

An example of the fixed beamforming is a delay and sum beamforming (DSB), which compensates for the time delay of output signals for each channel and performs phase matching with respect to a desired direction. Examples of the DSB method include, but are not limited to, Least Mean Square (LMS) method and Dolph-Chebyshev method. An adaptive beamforming may be designed such that the weight of the beamformer changes according to the signal environment. Examples of the adaptive beamforming methods include, but not limited to, Generalized Side-lobe Canceller (GSC) and Linearly Constrained Minimum Variance (LCMV).

In one embodiment, the acoustic signal processor 130 may calculate an angle of an object based on its position information included in the information about the object, and control a direction of the beam by controlling a delay and a level of the sound signal corresponding to the calculated angle of the object.

In one embodiment, the acoustic signal processor 130 may control an amplitude of the sound signal by assigning different weights to one or more speakers mounted in the vehicle, and form a beam that is spatially reducing a noise signal when the desired sound signal and the noise signal are different in the direction of the beam.

In one embodiment, the acoustic signal processor 130 may determine an output order of the beamformed sound signal using the rank information of the primary target object that is determined by the object detector 120. For example, the acoustic signal processor 130 may control the beamformed sound signals for the primary target objects in order of ranks and transmit the beamformed sound signals to one or more speakers to output the beamformed sound signals.

In one embodiment, the object detector 120 may divide the zones based on the distance away from the vehicle's travel path, groups the objects belonging to each zone, and the acoustic signal processor 130 may be configured to control the sound signal based on the zones. The frequency and the volume of the sound signal may be differently controlled by the acoustic signal processor 130, but the frequency and the volume of the sound signal may be controlled to be the same for the objects in the same zone.

For example, the object detector 120 may divide the detected objects into an object group A and an object group B. Those objects in the object group A may belong to an area that is closer to the vehicle and the driving path of the vehicle that those in the object group B. The frequency and the volume of the acoustic signal for the objects in the object group A may be greater than the frequency and the volume of the acoustic signal for the objects in the object group B.

In one embodiment, the vehicle sound control apparatus 10 may receive a noise signal inside the vehicle from a sensor mounted on the vehicle and generate a sound signal as well as another sound signal for canceling the noise signal. The vehicle sound control apparatus 10 may further include a noise canceling unit (not shown) for transmitting noise canceling signal to the speaker. The sensor mounted on the vehicle may be a microphone sensor that receives the noise signal. The noise signal may be received via the acoustic signal processor 130. The noise canceling unit may determine the frequency and the volume of a sound signal that includes a frequency component and a phase that can cancel the noise signal in the vehicle and determine the frequency and the volume of the sound signal to output to the speaker. A speaker mounted inside on the vehicle may output the sound signal including noise cancellation, and cancel the noise signal. The speaker mounted inside the vehicle may be various types of speakers, such as a speaker that generates sound using a diaphragm or vibration of a display panel.

In one embodiment, the vehicle sound control apparatus 10 may generate a warning signal for providing a notification inside the vehicle when it is determined that an object exists within a predetermined distance range from the vehicle based on the information on the object. The vehicle may further include a vehicle warning unit (not shown) that transmits a warning signal to an output unit (e.g., a speaker, an indicator) that may be mounted inside the vehicle or the warning signal may be recognizable by the driver of the vehicle.

The interior warning signal generated by the vehicle sound control apparatus 10 may provide a notification to the inside of the vehicle when it is determined that an object exists within a predetermined distance range from the vehicle based on information about the object, for example, distance information between the object and the vehicle. It can be delivered to the output unit mounted inside the vehicle. The predetermined distance range may be a range in which the object and the vehicle may have a risk of collision, and may be determined in consideration of the speed of the object and the speed of the vehicle. When the distance between the object and the vehicle is within a predetermined distance range, there is a high risk of collision. Therefore, the warning signal can provide a notification to the inside of the vehicle. The output unit mounted inside the vehicle may include a speaker for outputting an acoustic signal, a vibration device of a steering wheel, a vibration device of a driver seat, an internal display device, and the like. In addition, a variety of output devices can provide a notification to the driver, it may be configured of one or more types. A suitable in-vehicle warning signal may be output based on the type of output unit.

In one embodiment, the vehicle sound control apparatus 10 may establish a communication connection with another vehicle (hereinafter, also referred to as a surrounding vehicle) identified as an object. For example, the vehicle sound control apparatus 10 may include a communication unit (not shown) that transmits a warning signal to surrounding vehicles when it determines that a surrounding vehicle is within a predetermined distance range from its own vehicle. The surrounding vehicle may be determined as an object based on its shape or size in a process of selecting primary target objects. That is, when the vehicle sound control apparatus 10 determines that the object that corresponds to the vehicle based on the shape or size of the object and that the vehicle is within a predetermined distance range from the own vehicle, the communication unit may establish a communication connection with the surrounding vehicle and transmit a warning signal to the surrounding vehicle.

The communication unit (herein also referred to as a communication module) may establish communication between vehicles, between a vehicle and infrastructure, between a vehicle and a server, and within a vehicle. To this end, the communication module may include a transmitting module and a receiving module. For example, the communication module may include a wireless Internet module, a short-range communication module, a location information module, an optical communication module, a vehicle-to-vehicle communication (V2X) communication module, and the like.

The wireless Internet module having wireless Internet access may be built in or externally mounted to the vehicle. The short-range communication module may provide various short-range wireless protocols including, but not limited to, short-range communication, and includes Bluetooth™, Radio Frequency Identification (RFID), Infrared Data Association (IrDA), Ultra-Wideband (UWB), ZigBee, and NFC (Near). Near field communication module may support at least one of Field Communication (Wireless-Fidelity), Wi-Fi Direct, and Wireless Universal Serial Bus (Wireless USB) technologies.

The location information module may obtain location information of the vehicle, and examples thereof include, but are not limited to, a Global Positioning System (GPS) module. For example, the vehicle may acquire its position using a signal transmitted from the GPS satellites. In some embodiments, the location information module may be a component included in the in-vehicle sensor module 13, and it may not be a component included in the location information module or the communication module.

The optical communication module may include a light emitting unit (e.g., an optical transmitter) and a light receiving unit (e.g., an optical receiver). The light emitting unit and the light receiving unit may convert light signals into electrical signals or vice versa to transmit and receive information.

The V2X communication module may provide wireless communication with a server or another vehicle, an infrastructure device, or the like. The V2X communication module allows the vehicle to exchange information with other vehicles, mobile devices, roads, and the like through a wired connection and/or a wireless network. The V2X communication module may include Vehicle to Vehicle (V2V), Vehicle to Infrastructure (V2I), Vehicle to Nomadic Device (V2N), and Vehicle to Pedestrian (V2P) communication. The V2X communication module may be based on Dedicated Short-Range Communications (DSRC) proposed by the Institute of Electrical and Electronics Engineers (IEEE) or Wireless Access in Vehicular Environment (WAVE) or 5.9 GHz. In addition, an IEEE 802.11p communication technology using an existing wireless communication frequency band may be used. It should be understood that the V2X communication should include any inter-vehicle communication capable of communicating with other vehicles, mobile devices, roads, and the like.

In one embodiment, when the object detector 120 of the vehicle sound control apparatus 10 obtains information about an object using not only one or more sensors mounted on the vehicle (herein also referred to as a host vehicle) but also a communication unit, for example, a V2V communication module. In addition, the object detector 120 may obtain information about an object detected from one or more sensors mounted on another vehicle. That is, the object detector 120 may use the sensing information detected by one or more sensors mounted on the own vehicle and/or the sensing information that is detected by one or more sensors mounted on another vehicle and received through the V2V communication module. An object near the vehicle may be detected, and the information about the detected object may be obtained. For example, the host vehicle has a sensing area of 20 meters in the front and a sensing area of 10 meters in the rear, and similarly, a preceding vehicle located in front of the host vehicle has a sensing area of 20 meters in front and a sensing area of 10 meters in the rear. In addition to the sensing information detected by the sensor of the host vehicle, the object detector 120 may further use the sensing information sensed by the sensor(s) of the preceding vehicle received by the V2V communication module, so that the sensing area detected by the host vehicle can be approximately extended to 30 m.

Figure 4:
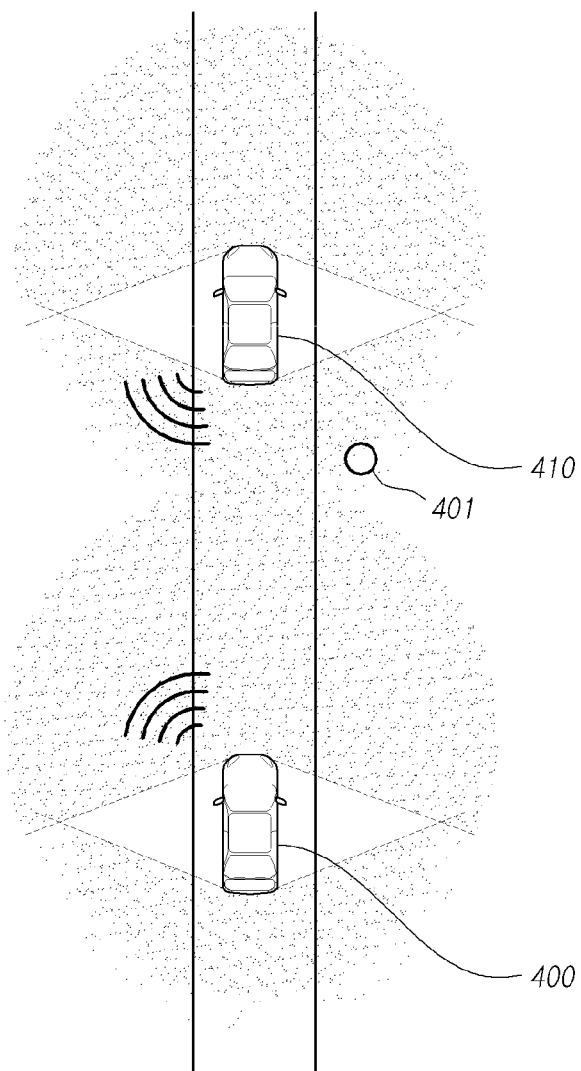
FIG. 4 illustrates a method of extending a sensing range of an object by communicating with other vehicles in accordance with an exemplary embodiment.

FIG. 4 illustrates a method of extending a sensing range of an object by communicating with another vehicle according to an exemplary embodiment.

Referring to FIG. 4, a host vehicle 400 has a sensor that can detect up to 20 meters in front and 10 meters in the rear. In this case, the vehicle 400 may detect an object located within a distance of 20 meters in front of the host vehicle 400 (including the front side) or 10 meters of the rear (including the rear side), but an object located outside the sensing range of the host vehicle 400 may not be detectable by the host vehicle 400. That is, due to the limitation of the sensing distance of the host vehicle 400, for example, an object 401 that is located at a distance of 25 meters out of the front sensing distance of the host vehicle 400 is not detectable by the host vehicle 400.

However, the vehicle sound control apparatus 10 according to an exemplary embodiment of the present disclosure may receive image data captured by the image sensor of a surrounding vehicle and/or sensing data captured by the non-image sensor of the surrounding vehicle near the host vehicle 400 via V2V communication. In the example illustrated in FIG. 4, the host vehicle 400 may perform wireless communication, e.g., V2V communication, with a preceding vehicle 410 located in front of the host vehicle 400. Here, when the preceding vehicle 410 is equipped with a sensor having a sensing distance of 20 m in the front and 10 meters in the rear similarly to the host vehicle 400, the preceding vehicle 410 may not be detectable by the host vehicle 400, however, an object 401 that is 5 m behind of the preceding vehicle 410 but is located 25 meters ahead of the host vehicle 400 may be detected. The object detector 120 of the host vehicle 400 may receive the sensing information from the preceding vehicle 410 through the V2V communication unit to detect the object 401. That is, the object detector 120 of the host vehicle 400 may receive image data captured by the image sensor of the host vehicle 400, sensing data captured by the non-image sensor of the host vehicle 400, and image and sensing data captured by the preceding vehicle 410. That is, the host vehicle 400 may be able to detect an object using at least one of the captured image data and the sensing data captured by the non-image sensor of the host vehicle 400 and one or more surrounding vehicles including the preceding vehicle 410. Accordingly, the vehicle sound control apparatus 10 can detect an object by using not only the sensor of the own vehicle but also the sensor of any surrounding vehicle that can communicate with the vehicle sound control apparatus 10, thereby extending the detection range of the host vehicle 400.

According to the present disclosure, the vehicle sound control apparatus 10 may obtain information about the host vehicle 40, calculate a driving route of the host vehicle 400, and detect object near the host vehicle 400 using one or more sensors mounted on the host vehicle 400. The vehicle sound control apparatus 10 may detect an object around the driving route of the host vehicle 400, obtain information about the detected object, and control the frequency and the volume of an acoustic signal based on the information about the vehicle and the information about the object.

The vehicle sound control apparatus controls the frequency and the volume of the sound signal and outputs the sound signal based on the information of the vehicle and the object to warn pedestrians near the vehicle to quickly recognize the approach of the vehicle.

Figure 5:
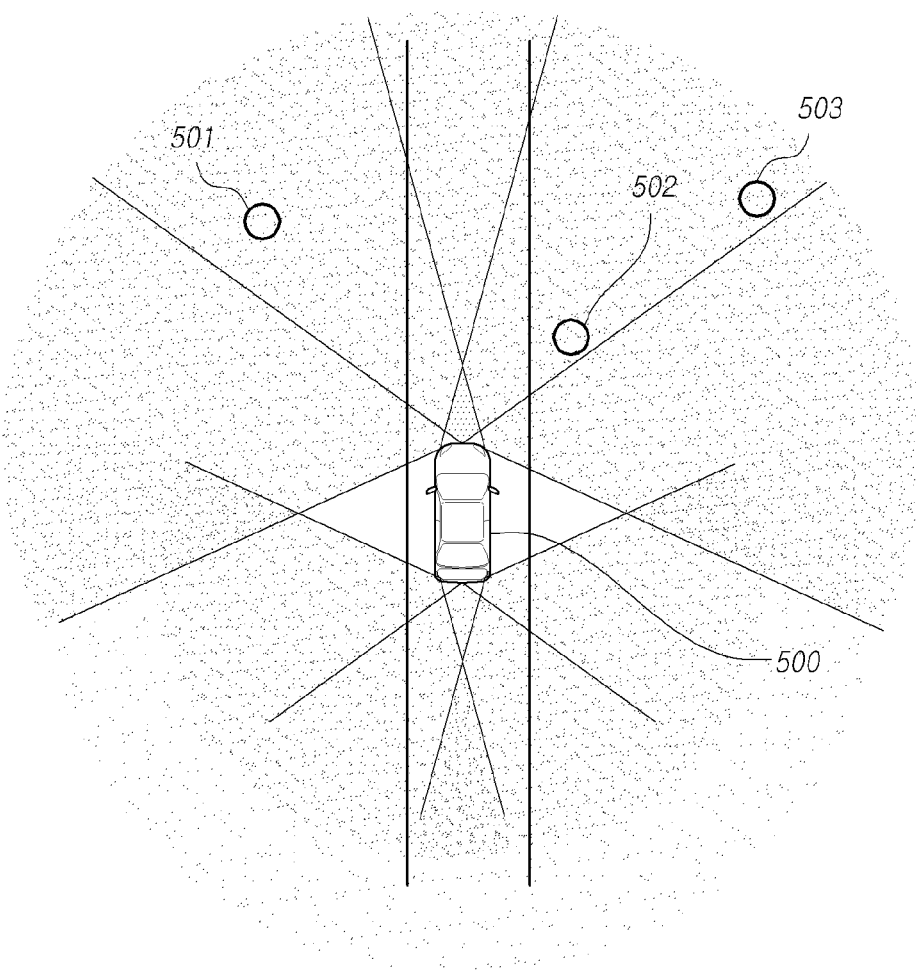
FIG. 5 illustrates a method of calculating a driving route of a vehicle according to an exemplary embodiment of the present disclosure and detecting an object around the driving route.

FIG. 5 illustrates a method of calculating a driving route of a vehicle and sensing an object around a driving route according to an embodiment of the present disclosure. Referring to FIG. 5, the driving path calculated by the driving route calculator 110 of a vehicle 500 including the vehicle sound control apparatus 10 is a straight line. The object detector 120 may acquire information about the object using data received from the image sensor and/or the non-image sensor mounted on the vehicle 500.

In the example shown in FIG. 5, the object detector 120 of the vehicle 500 detects three objects 501, 502, and 503 using the object information received from an image sensor and/or a non-image sensor.

The object detector 120 may acquire at least one of the following information/data; the distance between the vehicle 500 and the object 501, the distance between the vehicle 500 and the object 502, and the distance between the vehicle 500 and the object 503 based on data received from the image sensor and/or the non-image sensor, the speed, shape, and/or size of the object 501, the speed, shape, and/or size of the object 502, the speed, shape, and/or size of the object 503, the relative distance of the object 501 relative to the traveling route of the vehicle 500, the relative position or distance of the object 502 relative to the traveling route of the vehicle 500, the relative distance of the object 503 relative to the driving route of the vehicle 500.

The object detector 120 may select an object around the driving route of the vehicle 500 from among the detected objects based on the obtained information. In addition, the object detector 120 may determine the ranking of the detected objects based on their information.

For example, the object detector 120 checks a distance from the vehicle 500 of the objects 501, 502, and 503 and a relative position with respect to the driving path of the vehicle 500. In the example shown in FIG. 5, the distance between the object 502 and the vehicle 500 is 20 meters, the distance between the object 501 and the vehicle 500 is 40 meters, the distance between the object 503 and the vehicle 500 is 50 meters. Further, the distance between the object 502 and the driving path of the vehicle 500 is 10 meters, the distance between the object 501 and the driving path of the vehicle 500 is 30 meters, and the distance between the object 503 and the driving path of the vehicle 500 is 40 meters. In this case, since the distance from the vehicle 500 and the distance from the vehicle's driving path are closer in the order of the objects 502, 501, and 503, the object detector 120 may allocate the priority in the order of the objects 502, 501, and 503.

The acoustic signal processor 130 may beamform based on the position of the object using location information of each object, for example, a distance between the object and the vehicle or a relative position of the object with respect to a driving path of the vehicle. For example, the acoustic signal processor 130 may first beamform the sound signal to the position of the final target object (i.e., the closest among the detected target objects) using the position information of the final target object. Thereafter, the acoustic signal may be beamformed to the location of the second highest priority target object using the location information of the second highest priority target object. That is, the vehicle sound control apparatus 10 may beam-form an acoustic signal to the detected object in order of priority.

Figure 6:
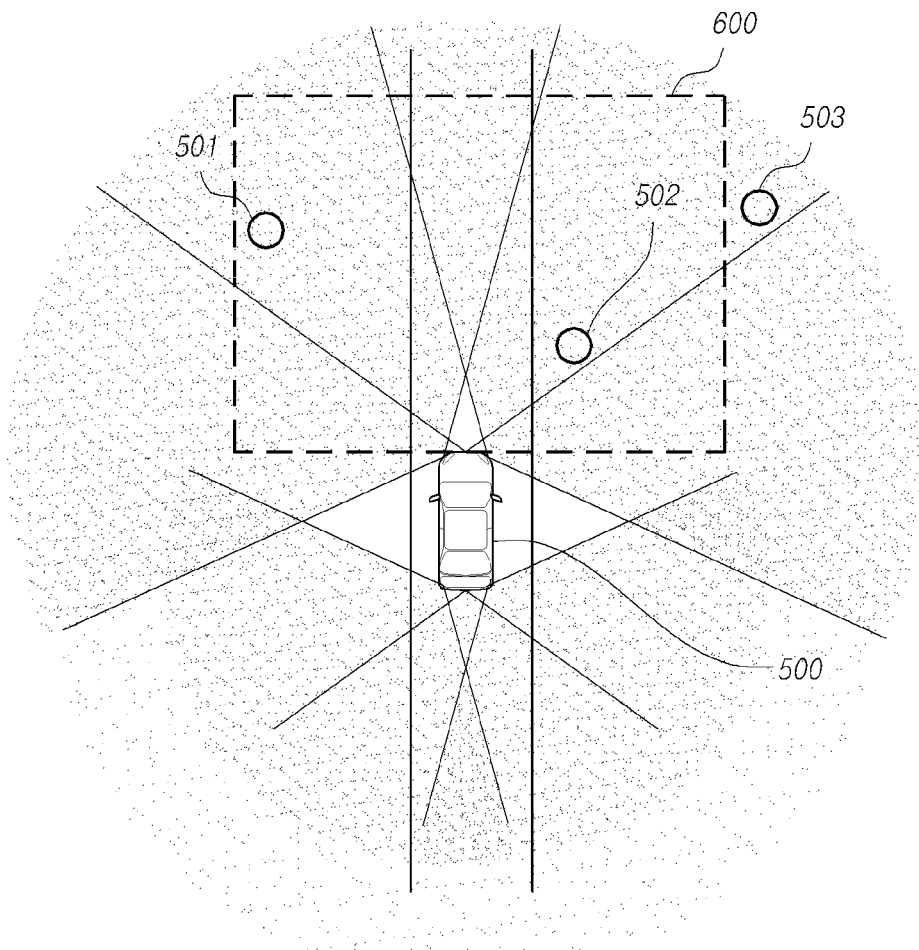
FIG. 6 illustrates a method of selecting an object around a driving path of a vehicle according to an exemplary embodiment.

FIG. 6 illustrates a method of selecting an object around a driving path of a vehicle according to an exemplary embodiment. Referring to FIG. 6, the object detector 120 of the vehicle 500 is configured to select objects that are within a predetermined area with respect to the driving path of the vehicle in the driving direction of the vehicle 500 based on information about the detected object, for example, the position of the object and/or the relative position of the driving path of the vehicle. In the present example, objects 501 and 502 that are within a dotted area 600 may be extracted and selected as the primary target objects. In addition, the object detector 120 may rank the selected primary target objects 501 and 502 based on the information on the object.

For example, the object detector 120 of the vehicle 500 checks a distance from the vehicle 500 of the objects 501 and 502 that are within the predetermined range identified by the dotted area 600 in front of the vehicle 500 and a relative position with respect to the driving route of the vehicle 500. For example, the distance between the object 502 and the vehicle 500 is 20 meters, the distance between the object 501 and the vehicle 500 is 40 meters, the distance between the object 502 and the driving path of the vehicle 500 is 10 meters, and the distance between the object 501 and the driving path of the vehicle 500 is 30 meters. In this case, since the distance between the object 502 the vehicle 500 and the distance between the object 502 and the driving path of the vehicle 500 are relatively closer than the object 501, the object detector 120 may assign the object 502 with a higher priority than the object 501.

The acoustic signal processor 130 may beamform based on the position of the object using position information of each object, for example, the distance between the object and the vehicle 500 or the relative position of the object with respect to the driving path of the vehicle 500, and output the sound signals in order of priority to the speaker.

The vehicle sound control apparatus 10 according to the exemplary embodiment of FIG. 6 may select objects by limiting a range of object detection to a predetermined range 600 in front of the vehicle 500 and control the sound signal only for the selected objects and output the sound signal using the speaker. Therefore, the vehicle sound control apparatus 10 may perform efficient vehicle acoustic sound control by excluding objects that are not detected or are detected but away from the vehicle 500 or located far from the vehicle's driving path out of the predetermined range 600.

Figure 7:
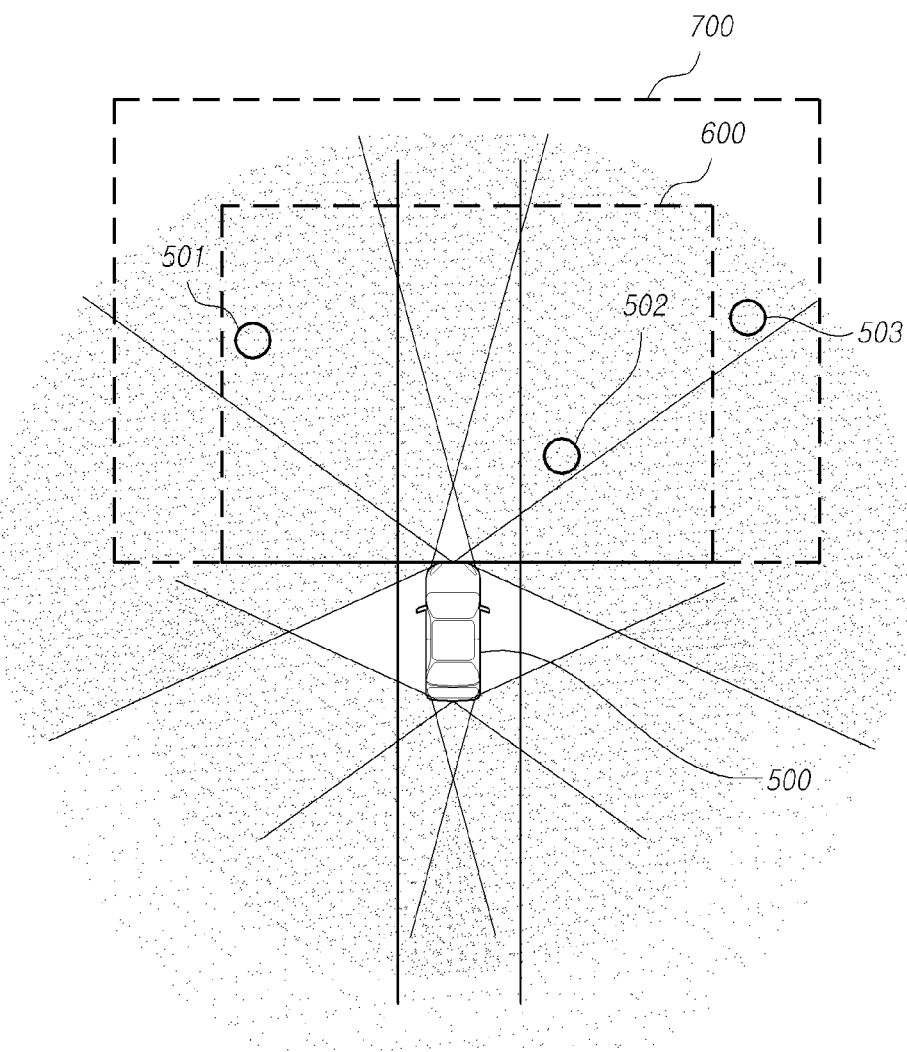
FIG. 7 illustrates a method of selecting an object around a driving path of a vehicle according to another exemplary embodiment of the present disclosure.

FIG. 7 illustrates a method of selecting an object around a driving path of a vehicle according to another exemplary embodiment of the present disclosure. In FIG. 7, the object detector 120 of the vehicle 500 may detect objects in by dividing the object detection area into one or more areas or zones including the predetermine range 600 shown in FIG. 6 and group the detected objects in each zone to control an acoustic signal for the objects based on the zones.

Referring to FIG. 7, the object detector 120 divides a plurality of zones based on a distance from the front of the vehicle and/or a distance from the driving path of the vehicle. For example, the object detector 120 may set a first zone 600 that is within a first distance from the front of the vehicle 500 and within a second distance spaced apart from the driving path of the vehicle 500, and a second zone 600 that is out of the first distance but within a third distance from the front of the vehicle 500 and out of the second distance but within a third distance from the driving path of the vehicle 500.

The object detector 120 may extract objects in each of the first zone 600 and the second zone 600 based on the information about the detected object, for example, the location of the object and/or the relative location of the driving path of the vehicle 500. In FIG. 7, the first area 600 includes objects 501 and 502, and the second area 700 includes an object 503. The object detector 120 may rank the objects in each zone to determine the order of signal beamforming. As another example, the object detector 120 may assign the same priority to the objects in the same zone. In this case, the acoustic signal processor 130 may apply the same priority and equal weights to the frequency and the volume of the sound signal with respect to the objects in the same zone.

Figure 8:
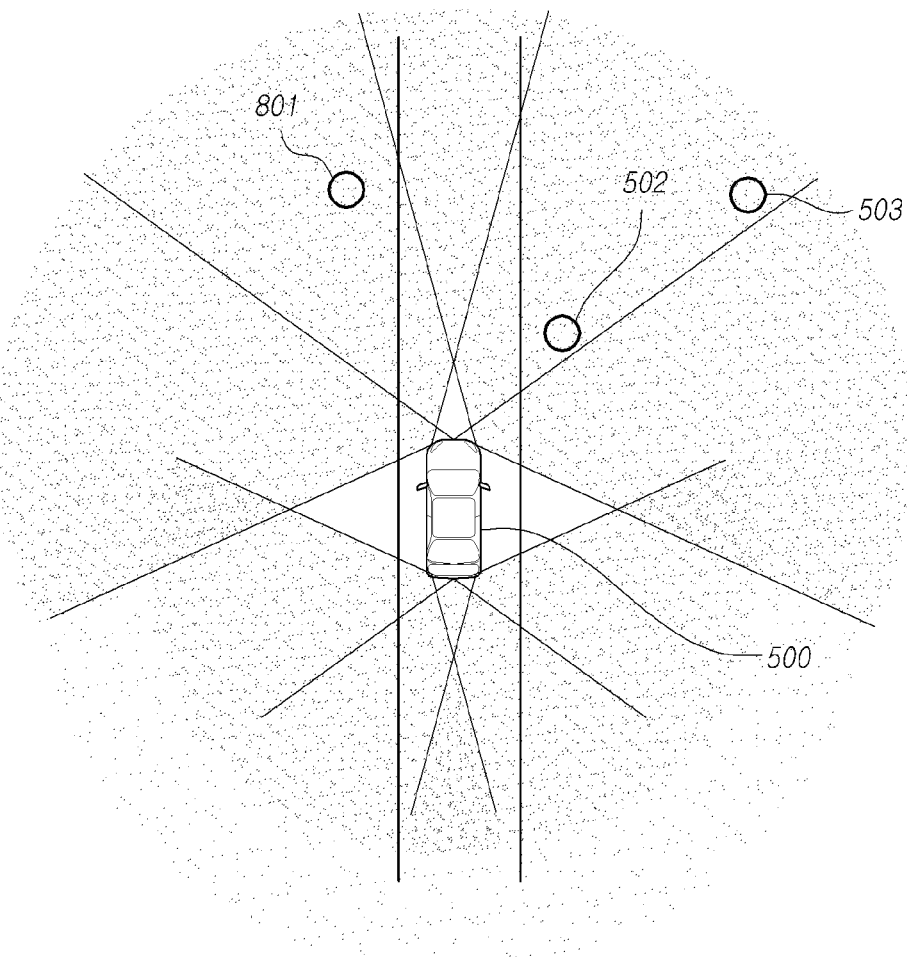
FIG. 8 illustrates a method of determining a rank of an object around a driving route of a vehicle according to an exemplary embodiment.

FIG. 8 illustrates a method of determining the rank of an object around a driving route of a vehicle according to an exemplary embodiment. The object detector 120 may detect the objects 801, 502, and 503 using information from the image sensor and/or the non-image sensor of the vehicle 500, and extract information on the objects by processing the acquired data. Reference may be made to the object detection and information acquisition methods described above. The object detector 120 may select one or more objects around the driving route of the vehicle among the detected objects based on the extracted information on the detected objects. In addition, the object detector 120 may determine the ranking of the selected objects based on their information.

In FIG. 8, the object detector 120 may check a distance of the objects from the vehicle 500 and a relative position of the driving path of the vehicle 500. The object detector 120 may first calculate a relative distance of each object with respect to the driving path of the vehicle, and assign the priority of the object based on the relative distance. The distance of the objects 801 and 502 from the driving path of the vehicle 500 is equal and 10 meters, and the distance of the object 503 from the driving path of the vehicle 500 is 40 meters. When the relative distances of the objects to the driving path of the vehicle are the same, the object detector 120 may determine the rank of those objects by further referencing the distance between the objects and the vehicle 500. In the present example, the object detector 120 may check distances between the vehicle and the objects 801 and 502 after determining that the objects 801 and 502 have the same distance from the driving path, determines that the object 502 is closer to the vehicle 500 than the object 802, and assign a higher priority to the object 502 because it has a relatively closer distance to the vehicle 500 than the object 801.

Figure 9:
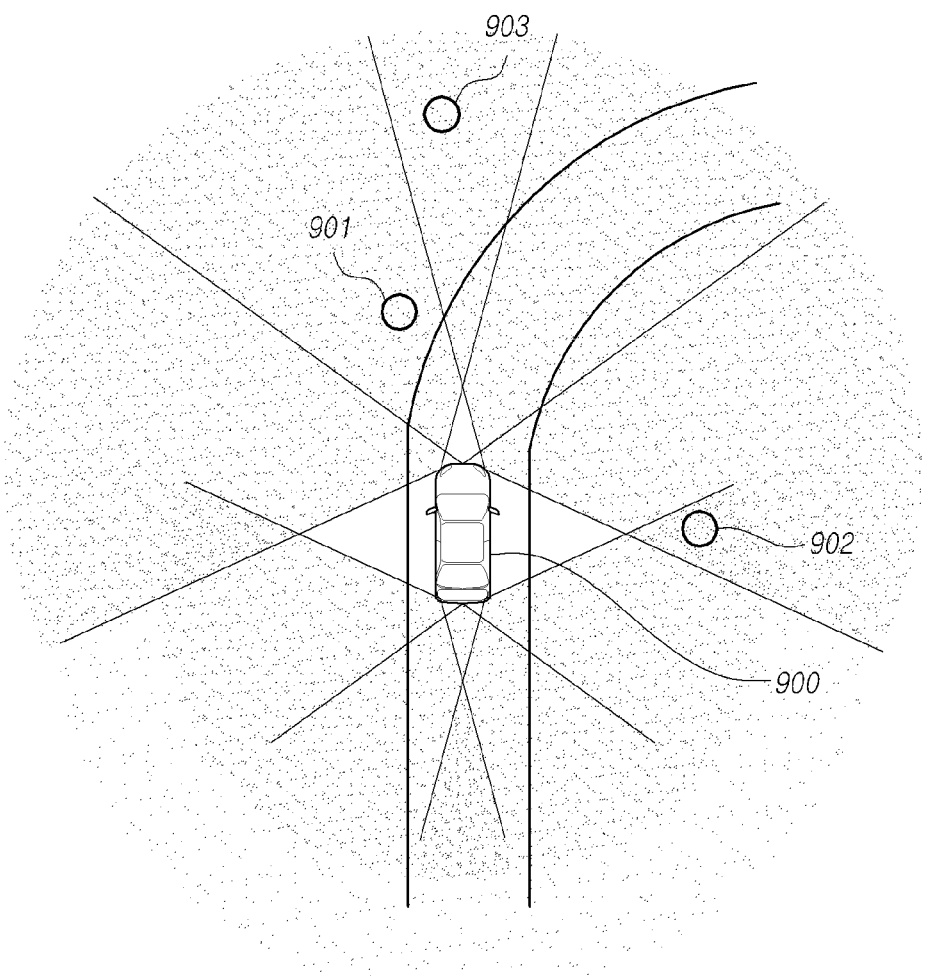
FIG. 9 illustrates a case in which a driving route of a vehicle is curved according to an exemplary embodiment of the present disclosure.

FIG. 9 illustrates a case in which a driving route of a vehicle is curved according to an exemplary embodiment of the present disclosure. When the driving path of the vehicle is curved, the object sensing method described with reference to FIG. 5 may be applied in the substantially similar manner.

In FIG. 9, the object detector 120 detects three objects 901, 902, and 903 using information from an image sensor and/or a non-image sensor of a vehicle 900. The object detector 120 of the vehicle 900 may process data received from the image sensor and/or the non-image sensor to determine at least one of a distance between the vehicle 900 and the objects 901, 902, and 903, the speed of the objects 901, 902, and 903, the shapes of the object 903, the sizes of the objects 901, 902, 903, and relative distances of the objects 901, 902, 903 with respect to the driving path of the vehicle 900. The object detector 120 may select objects around the driving route of the vehicle 900 among the detected objects based on the obtained information. In addition, the object detector 120 may determine the ranking of the detected object based on their information.

The acoustic signal processor 130 may beamform a sound signal based on the position of the object using location information of each object, for example, a distance between the object and the vehicle 900 or a relative position of the object with respect to the driving path of the vehicle. For example, the acoustic signal processor 130 may beamform the sound signal to the final target object (i.e., the closest among the detected target objects) using the position information of the final target object. Thereafter, the acoustic signal may be beamformed to the location of the second highest priority target object using the location information of the second highest priority target object. That is, the vehicle sound control apparatus 10 may beam-form an acoustic signal to the detected object in order of priority.

Figure 10:
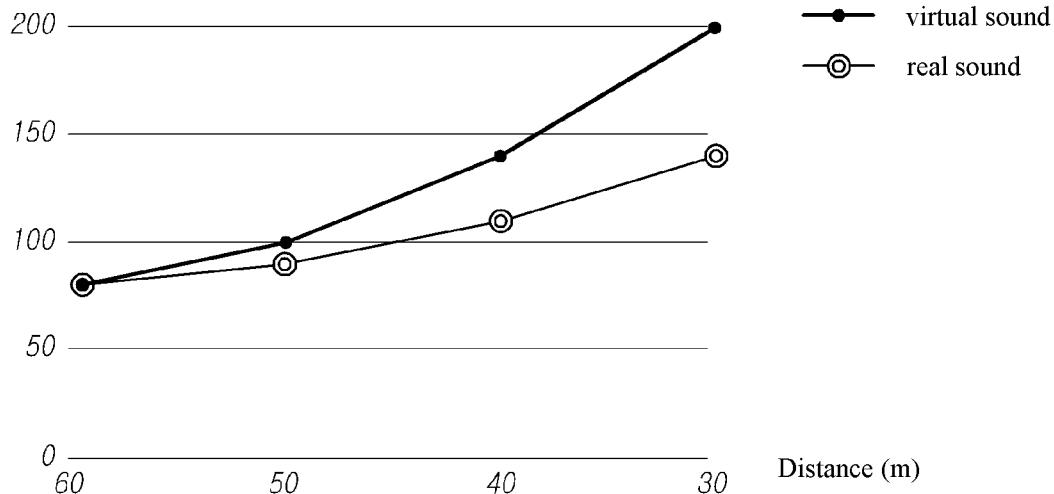
FIG. 10 is a graph illustrating a method of controlling the frequency of an acoustic signal according to an embodiment of the present disclosure.
Figure 11:
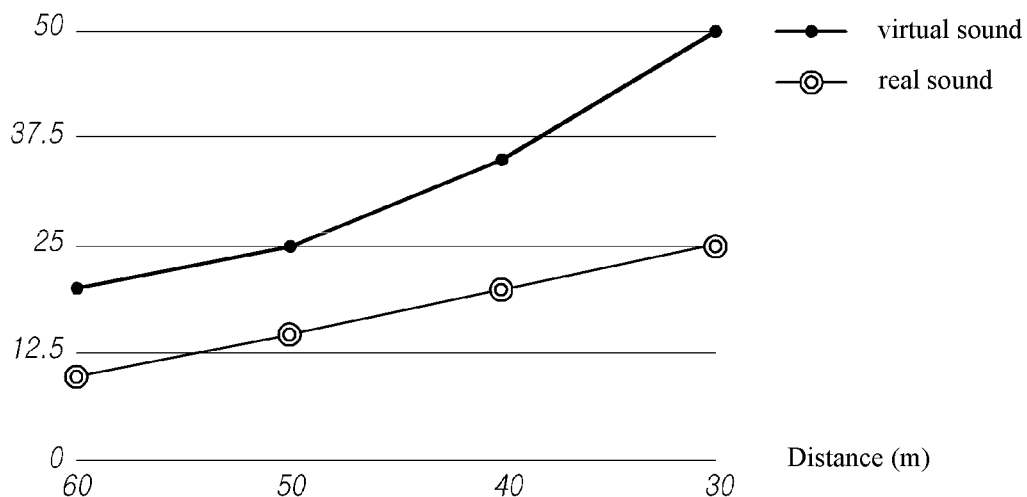
FIG. 11 is a graph illustrating a method of controlling the volume of an acoustic signal according to an embodiment of the present disclosure.

FIG. 10 and FIG. 11 are graphs respectively illustrating a method of controlling a frequency and a volume of an acoustic signal according to an embodiment of the present disclosure. The acoustic signal processor 130 may calculate a frequency and a volume of the sound signal according to the Doppler effect based on the speed information of the vehicle and the speed information of the object. The acoustic signal processor 130 may control the frequency and the volume of the sound signal by applying different weights according to the distance between the vehicle and the object or the relative distance of the object with respect to the driving path of the vehicle. The weights applied to the frequency and the volume of the sound signal according to the distance information between the vehicle and the object may be stored in a table of the vehicle sound control apparatus 10 shown in FIG. 1, and the acoustic signal processor 130 may determine the weight corresponding to the distance information between the vehicle and the object by looking up the table. Referring to FIG. 10 and FIG. 11, as the distance between the vehicle and the object or the relative distance of the object with respect to the driving path of the vehicle is closer, the frequency and the volume of the sound signal increase. That is, a greater weight is applied to the frequency and the volume of the sound signal as the distance between the vehicle and the object is closer, or the relative distance to the vehicle's driving path is closer to the driving path of the vehicle.

The weights applied to the frequency and the volume of the sound signal may be increased or decreased in steps based on the distance from the vehicle or the distance away from the vehicle's travel path. For example, as the distance from the vehicle or the distance away from the driving path of the vehicle becomes greater, a smaller weight may be applied to the frequency and the volume of the sound signal.

As another example, the object detection may be divided into zones based on the distance from the vehicle or the distance away from the travel path of the vehicle, and the weight may be gradually lowered in the zones based on the distance from the vehicle or the distance away from the travel path of the vehicle.

Figure 12:
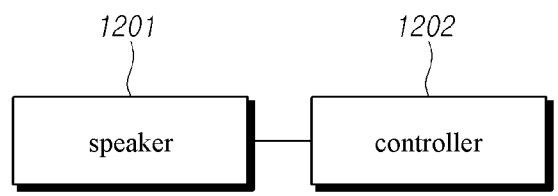
FIG. 12 is a block diagram of a vehicle acoustic apparatus according to an exemplary embodiment of the present disclosure.

FIG. 12 is a block diagram of a vehicle acoustic apparatus 1200 according to an exemplary embodiment of the present disclosure.

Referring to FIG. 12, the vehicle acoustic apparatus 1200 includes a speaker 1201 mounted in a vehicle and the controller 1202 for controlling the coupled speaker 1201. The speaker 1201 may represent one or more speakers in some embodiments. The controller 1202 of the vehicle acoustic apparatus 1200 may obtain information about the vehicle using one or more sensors mounted on the vehicle and calculate a driving route of the vehicle based on the information about the vehicle. The controller 1202 may further detect one or more objects near a driving path of the vehicle, obtain information about the detected objects, control the frequency and the volume of a sound signal based on the information about the vehicle and the objects, and convert the sound signal into acoustic signals to drive the speaker 1201.

The speakers 1201 included in the vehicle acoustic apparatus 1200 may output sound signals received from the controller 1202.

The speaker 1201 may be mounted at various positions of the vehicle, such as the front, rear, lateral sides of the vehicle, as described above.

In one embodiment, the controller 1202 may receive information about the vehicle from an internal sensor of the vehicle. The received information about the vehicle may include at least one of a speed, an acceleration, a position of the vehicle, and a rotation angle of the steering wheel.

For example, the controller 1202 may calculate the driving route of the vehicle using the speed information of the vehicle and the rotation angle information of the steering wheel. The controller 1202 may further use the acceleration of the vehicle and/or the rotation angle acceleration of the steering wheel to calculate the driving route of the vehicle.

In another example, the controller 1202 may receive a road or map information from a navigation module that may be included in or connected to a vehicle or an infrastructure server monitoring a road on which the vehicle is located, and calculate the driving route of the vehicle with reference to the road or map information. In addition, the controller 1202 may transmit the calculated driving route of the vehicle to a display unit of the vehicle to visually inform the driver of the driving route of the vehicle.

The controller 1202 may detect one or more objects near the driving path of the vehicle by using one or more sensors mounted on the vehicle, and obtain information on the detected object. One or more sensors mounted on the vehicle may include the image sensor module 11 and/or the non-image sensor module 12 shown in FIG. 1, and a description of each sensor module may be referred to the description of FIG. 1.

In one embodiment, the controller 1202 may determine the distance between the object and the vehicle, the speed of the object, based on the image data captured from the image sensor and/or the sensing data captured from the non-image sensor. At least one of the shape of the object, the size of the object, and the relative position of the object may be acquired as information about the object. The distance between the object and the vehicle may indicate the minimum distance between the object and the vehicle, for example a straight-line distance.

The relative position of the object may include a position difference between the objects, or may include a distance or a position between the object and the driving path of the vehicle. The distance between the object and the travel path of the vehicle may be measured using a straight line perpendicular to the travel path of the vehicle, and it may be the minimum distance from the travel path to the position of the object.

The controller 1202 may select a primary target object from the objects detected around the driving path of the vehicle based on the information on the object, and determine the rank of each primary target object.

In one embodiment, the controller 1202 may select a first primary target object that is within a first distance from the front of the vehicle based on the information about the object, and within a second distance from the travel path of the vehicle. In addition, the controller 1202 may rank the selected primary target objects based on their object information.

In one embodiment, the controller 1202 may assign the priority of the object based on the distance of the object from the vehicle and the relative position with respect to the driving route of the vehicle. For example, the controller 1202 may first calculate a relative distance of the object with respect to the driving route of the vehicle, and assign the priority of the object based on the relative distance. When the relative distance of the object to the driving path of the vehicle is the same, the controller 1202 may further use the distance between the object and the vehicle. In another example, the controller 1202 may determine the priority of the objects by first using the distance between the object and the vehicle, and further reference to the relative distance to the driving route of the vehicle when two or more objects have the same distance to the vehicle.

In an embodiment, the controller 1202 may select the primary target object by determining the type of the object based on the information about the object and/or the information about the vehicle. For example, the controller 1202 may classify the type of object based on the shape and/or size.

In one embodiment, the controller 1202 selects primary target objects by excluding those having a certain shape or a predetermined size based on the information on the object. The relative positions on the driving paths of the respective vehicles may be compared and ranked in the order of proximity to the driving paths, and the primary target object having the highest priority may be selected as the final target object.

Further, the controller 1202 may process the image data received from the image sensor, extract the shape of the object, and compare the extracted object shape with a predetermined shape of various objects stored in advance. The controller 1202 may calculate the similarity between the shape of the extracted object and a predetermined shape of the pre-stored objects, and select the primary target object based on the calculated similarity.

Alternatively, the controller 1202 may process the image data received from the image sensor to extract the shape of the object, calculate the similarity between the shape of the extracted object and a predetermined shape of the pre-stored objects, and select the object as the primary target object if there is a predetermined level of similarity.

Further, the controller 1202 may process the image data received from the image sensor to extract the size of the object, and compare the size of the extracted object with a predetermined size. If the size of the extracted object is smaller than a predetermined size, the controller 1202 may select the object as a primary target object.

Alternatively, the controller 1202 may process the image data received from the image sensor to extract the shape and size of the object, and may select the primary target object using the extracted shape and size of the object collectively.

In an embodiment, the controller 1202 may perform object learning based on machine learning. The controller 1202 may recognize an object previously learned by machine learning from the image data received from the image sensor, and extract information about the object based on the attributes of the recognized object.

The controller 1202 may include an artificial neural network (ANN) in the form of software, hardware, firmware and/or other means in which the attributes of the object are learned. The artificial neural network may extract feature information corresponding to each level by using a learned layer corresponding to each level. The artificial neural network may abstract the object sequentially to recognize an object using the highest level of feature information. The controller 1202 may include a deep neural network (DNN) such as a convolutional neural network (CNN), a recurrent neural network (RNN), a deep belief network (DBN), and the like.

The controller 1202 may distinguish the type of the objects based on machine learning, and classify the image data received from the image sensor based on the data learned in advance by the machine learning, and determine the attributes of the object. The controller 1202 may select a certain type of object as a primary target object.

The controller 1202 may calculate a relative position on the driving route of the vehicle of each of the primary target objects, compare the position of each state, and rank the objects in the order of proximity to the driving route. The controller 1202 may select the primary target object that is closest to the driving route as the final target object.

According to an embodiment, when there are a plurality of primary target objects close to the travel path, the controller 1202 may select the primary target object that is closest to the vehicle as the final target object.

The controller 1202 may control the frequency and the volume of the acoustic signal based on the information on the vehicle and the object, and transmit the acoustic signal to the speaker mounted in the vehicle. The speaker may include a device for outputting sound by converting an electrical signal into vibration of a diaphragm, or a device for outputting sound by vibrating including a display panel such as a crystal sound OLED or a device for outputting a sonic wave. Furthermore, the speaker may include a plurality of speakers, and may output sound signals using one or more speakers.

In an embodiment, the controller 1202 may control the volume and the frequency of an acoustic signal based on distance information between the vehicle and the object, the speed information of the vehicle included in the information about the vehicle, and the speed information of the object included in the information about the object.

In an embodiment, the controller 1202 may calculate a frequency and a volume of the sound signal according to the Doppler effect based on the speed information of the vehicle and the speed information of the object. The frequency and volume of the sound signal may be determined by applying weights according to the distance information. The weights applied to the frequency and the volume of the sound signal according to the distance information between the vehicle and the object are stored in a table, and the controller may determine the weight corresponding to the distance information between the vehicle and the object by referencing to the entries in the table.

In one embodiment, a greater weight may be applied to the frequency and the volume of the acoustic signal as the distance between the vehicle and the object is closer or the relative position with respect to the vehicle's travel path is closer to the vehicle's travel path. For example, the closer the object is to the vehicle, the greater weight is applied to the frequency and the volume of the acoustic signal, and the closer the object to the vehicle's travel path is, the greater weight is applied to the frequency and the volume of the acoustic signal.

In one embodiment, the weights applied to the frequency and the volume of the acoustic signal may be varied based on a distance from the vehicle or a distance away from the vehicle's travel path. For example, as the distance from the vehicle or the distance away from the driving path of the vehicle becomes greater, a smaller weight may be applied to the frequency and the volume of the sound signal.

In another example, zones may be divided based on the distance from the vehicle or the distance away from the travel path of the vehicle, and the weight may be gradually lowered in the zones based on the distance from the vehicle or the distance away from the travel path of the vehicle.

In an embodiment, the controller 1202 may beamform an acoustic signal to the object using the position information of each object included in the information about the object.

In an embodiment, the controller 1202 may control the direction of the beam by calculating an angle of the object based on the position information of each object included in the information about the object, and by controlling delays and levels of the sound signal for each object to correspond to the calculated angle of the object.

In one embodiment, the controller 1202 may form the beam by controlling the amplitude of the acoustic signal by assigning different weights to one or more speakers mounted in the vehicle, thereby spatially reducing the noise when the desired acoustic signal and the noise signal are different in the beaming direction.

In an embodiment, the controller 1202 may determine the output order of the beamformed sound signal using the identified ranking information of the primary target objects. In detail, the controller 1202 may perform beamforming control on the acoustic signals for each object in the order of the objects, and transmit the beamformed sound signals to one or more speakers.

In one embodiment, the controller 1202 may divide the zones based on the distance away from the vehicle's travel path and group the objects in the respective zones. While controlling differently, the frequency and the volume of the sound signal can be controlled to be the same for the objects grouped in the same zone.

In one embodiment, the controller 1202 may further receive a noise signal from a sensor mounted on the vehicle, generate a sound signal and a noise-canceling signal. The generated sound signal may be transmitted to a speaker mounted in the vehicle. The sensor mounted on the vehicle may be a microphone sensor that receives the noise signal.

The controller 1202 may determine the frequency and the volume of the sound signal that can cancel noise signals in the vehicle in consideration of the frequency and the volume of the acoustic signal and the noise signal, and transmit the frequency and the volume of the determined sound signal to the speaker mounted inside the vehicle.

The speaker mounted inside the vehicle may output the received sound signal, and cancel the noise sound to remove noise inside the vehicle and maintain a pleasant environment.

The speaker mounted inside the vehicle may be various types of speakers, such as a speaker that generates sound using a diaphragm or a speaker that generates sound using vibration of a display panel.

In one embodiment, the controller 1202 may further generate, when it is determined that an object exists within a predetermined distance range from the vehicle based on the information about the object, a warning signal to provide a notification, and the warning signal may be transmitted to an output unit mounted inside the vehicle.

If the controller 1201 determines that an object exists within a predetermined distance range from the vehicle based on the information about the object, for example, the distance information between the object and the vehicle, the controller 1202 may provide a warning signal for providing a notification to a driver inside the vehicle. The warning signal can be generated and delivered to the output unit mounted inside the vehicle.

Figure 13:
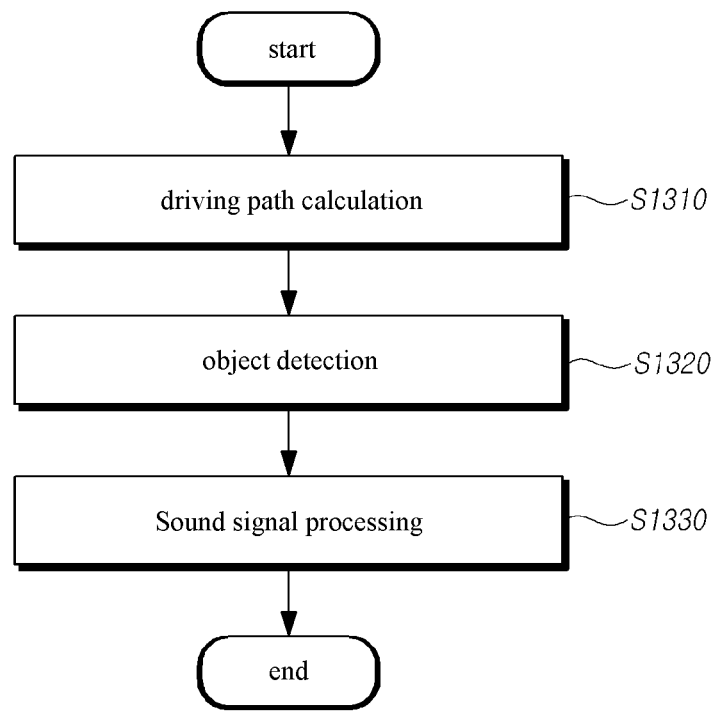
FIG. 13 is a flowchart of a vehicle sound control method according to an embodiment of the present disclosure.

FIG. 13 is a flowchart of a vehicle sound control method according to an embodiment of the present disclosure.

Referring to FIG. 13, the vehicle sound control method of the present disclosure includes a driving path calculating step (S1310) of obtaining information about a vehicle equipped with one or more speakers and calculating a driving route of the vehicle using one or more sensors mounted on the vehicle, and an object detection step (S1320) to obtain information about the detected object, and a sound signal processing (S1330) for controlling a frequency and a volume of a sound signal based on the information about the vehicle and the information about the object and transmitting the sound signal to the speaker mounted in the vehicle.

According to the vehicle sound control method of the present disclosure, the vehicle sound control method may acquire information about a vehicle equipped with one or more speakers, calculate a driving route of the vehicle using one or more sensors mounted on the vehicle. Objects around a path are detected, information about the detected object is obtained, and the frequency and the volume of the sound signal are controlled based on the information about the vehicle and the information about the object. The present vehicle sound control method controls the frequency and the volume of the sound signal based on the information of the vehicle and the object to allow pedestrians near the vehicle to quickly recognize the approach of the vehicle to ensure safety.

According to one embodiment, an apparatus includes: a driving route calculator configured to obtain vehicle information about a vehicle and calculate a driving path of the vehicle; an object detector configured to detect an object near the vehicle or the driving path of the vehicle using one or more sensors mounted on the vehicle, and obtain object information on the object; and an acoustic signal processor configured to control a frequency and a volume of an acoustic signal based on the vehicle information and the object information, and transmit the acoustic signal to a speaker mounted on the vehicle.

The vehicle information may include at least one of a speed, an acceleration, a location, and a rotation angle of a steering wheel of the vehicle.

The apparatus may further include an image sensor and a non-image sensor, wherein the object detector may detect the object based on at least one of a distance between the object and the vehicle, a distance between the object and the driving path of the vehicle, a speed of the object, a shape of the object, a size of the object using image data captured by the image sensor and sensing data captured by the non-image sensor.

The object detector may select one or more primary target objects based on a size or a shape of the object by excluding one or more objects that are smaller than a predetermined size or different from a predetermined shape, rank the one or more primary objects based on proximity to the driving path of the vehicle, and select a final target object that is closest to the vehicle among the one or more primary objects.

The acoustic signal processor may control the frequency and the volume of the acoustic signal based on relative distance information between the vehicle and the object using a vehicle speed of the vehicle included in the vehicle information and an object speed of the object included in the object information.

The acoustic signal processor may control the frequency and the volume of the acoustic signal according to the Doppler effect and applies a weight to the frequency and the volume of the acoustic signal according to the distance information between the vehicle and the object.

A greater weight may be applied as the distance between the object and the vehicle or distance between the object and the driving path of the vehicle is closer.

The acoustic signal processor may beamform the acoustic signal based on a position of the object obtained from the object information.

The object detector may divide zones based on a distance from the driving path of the vehicle and groups objects in each of the zones, and the acoustic signal processor may control the frequency and the volume of the acoustic signal corresponding to objects based on the zones and apply a same weight to the frequency and the volume of the acoustic signal corresponding to objects in a same zone.

The apparatus may further comprising a noise canceling unit, wherein the noise canceling unit may receive a noise signal from at least one of the one or more sensors, generate a noise-canceling signal based on the noise signal, and transmit the noise-canceling signal to the acoustic signal processor, and the acoustic signal processor may transmit the acoustic signal including the noise-canceling signal.

The apparatus may further include a vehicle warning unit, wherein the vehicle warning unit may generate a warning signal based on detection of the object within a predetermined range from the vehicle and transmit the warning signal to the speaker.

The apparatus may further include a communication module to establish communication with a surrounding vehicle and transmit a warning signal to the surrounding vehicles when the surrounding vehicle is within a predetermined distance from the vehicle.

The apparatus may further include a communication module to receive surrounding image data captured and surrounding sensing data captured by a surrounding vehicle, and wherein the object detector may detect the object using image data captured and sensing data captured by the vehicle and using the surrounding image data captured and the surrounding sensing data captured by a surrounding vehicle.

According to one embodiment, a method includes: obtaining vehicle information about a vehicle and calculate a driving path of the vehicle; detecting one or more objects within a predetermined range from the vehicle or the driving path of the vehicle using one or more sensors mounted on the vehicle; obtaining object information on each of the one or more objects; controlling a frequency and a volume of an acoustic signal based on the vehicle information and the object information; and transmitting the acoustic signal to a speaker mounted on the vehicle.

The vehicle information may include at least one of a speed, an acceleration, a location, and a rotation angle of a steering wheel of the vehicle.

The method may further include: receiving image data from an image sensor and sensing date from a non-image sensor; and detecting the one or more objects based on at least one of a distance between each of the one or more objects and the vehicle, a distance between each of the one or more objects and the driving path of the vehicle, a speed, a shape, a size.

The method may further include: selecting one or more primary target objects based on a size or a shape of the object by excluding an object that is smaller than a predetermined size or different from a predetermined shape; ranking the one or more primary objects based on proximity to the driving path of the vehicle, and selecting a final target object that is closest to the vehicle among the one or more primary objects.

The method may further include applying a weight to the frequency and the volume of the acoustic signal according to the distance information between the vehicle and each of the one or more objects.

A greater weight may be applied as the distance between the object and the vehicle or distance between each of the one or more objects and the driving path of the vehicle is closer.

The method may further include: dividing zones based on a distance from the driving path of the vehicle and groups the one or more objects in each of the zones; and controlling the frequency and the volume of the acoustic signal corresponding to objects based on the zones and applies a same weight to the frequency and the volume of the acoustic signal corresponding to objects in a same zone.

The terms "system", "processor", "controller", "component", "module", "interface", "model", and "unit" described above generally refer to a combination of computer-related entity hardware, hardware, and software. It can mean software or running software. For example, the aforementioned components may be, but are not limited to, a process driven by a processor, a processor, a controller, a control processor, an object, an execution thread, a program, and/or a computer.

For example, both an application running on a controller or processor and a controller or processor can be components. One or more components may be within a process and/or thread of execution and a component may be located on one system or deployed on more than one system.

The terms "comprise", "comprise" or "having" described above mean that a corresponding component may be included unless specifically stated otherwise, and thus, other components are not excluded. It should be construed that it may further include other components. All terms, including technical and scientific terms, have the same meanings as commonly understood by one of ordinary skill in the art unless otherwise defined. Terms commonly used, such as terms defined in a dictionary, should be interpreted to coincide with the contextual meaning of the related art, and shall not be construed in an ideal or overly formal sense unless explicitly defined in the present disclosure.

The description above and the accompanying drawings are merely illustrative of the technical spirit of the present disclosure, and a person of ordinary skill in the art to which the present disclosure pertains may combine the configurations without departing from the essential characteristics of the present disclosure. Various modifications and variations may be made, including separation, substitution, and alteration. Therefore, the embodiments disclosed in the present disclosure are not intended to limit the technical spirit of the present disclosure but to describe the present disclosure, and the scope of the technical spirit of the present disclosure is not limited by these embodiments. In other words, within the scope of the present disclosure, all of the components may be selectively operated in combination with one or more. The scope of protection of the present disclosure should be interpreted by the following claims, and all technical ideas within the scope equivalent thereto should be construed as being included in the scope of the present disclosure.

What is claimed is:

1. An apparatus comprising:
    a driving route calculator configured to obtain vehicle information about a vehicle and calculate a driving path of the vehicle;
    an object detector configured to detect an object near the vehicle or the driving path of the vehicle using one or more sensors mounted on the vehicle, and obtain object information on the object; and
    an acoustic signal processor configured to control a frequency and a volume of an acoustic signal corresponding to the object based on the vehicle information and the object information,
    wherein the acoustic signal processor is further configured to generate a beamformed acoustic signal of the acoustic signal with direction information by controlling a delay and a level of the acoustic signal based on an angle of the object, and transmit the beamformed acoustic signal to two or more speakers mounted on the vehicle, and
    wherein each of the two or more speakers outputs the beamformed acoustic signal by controlling an amplitude based on a weight that is assigned to a respective one of the two or more speakers.

2. The apparatus of claim 1, wherein the vehicle information includes at least one of a speed, an acceleration, a location, and a rotation angle of a steering wheel of the vehicle.

3. The apparatus of claim 1, further comprising an image sensor and a non-image sensor, wherein the object detector detects the object based on at least one of a distance between the object and the vehicle, a distance between the object and the driving path of the vehicle, a speed of the object, a shape of the object, a size of the object using image data captured by the image sensor and sensing data captured by the non-image sensor.

4. The apparatus of claim 1, wherein the object detector selects one or more primary target objects based on a size or a shape of the object by excluding one or more objects that are smaller than a predetermined size or different from a predetermined shape, ranks the one or more primary objects based on proximity to the driving path of the vehicle, and selects a final target object that is closest to the vehicle among the one or more primary objects.

5. The apparatus of claim 1, wherein the acoustic signal processor controls the frequency and the volume of the acoustic signal based on relative distance information between the vehicle and the object using a vehicle speed of the vehicle included in the vehicle information and an object speed of the object included in the object information.

6. The apparatus of claim 5, wherein the acoustic signal processor controls the frequency and the volume of the acoustic signal according to the Doppler effect and applies the weight to the frequency and the volume of the acoustic signal according to the distance information between the vehicle and the object.

7. The apparatus of claim 6, wherein a greater weight is applied as the distance between the object and the vehicle or distance between the object and the driving path of the vehicle is closer.

8. The apparatus of claim 1, wherein the acoustic signal processor transmits the beamformed acoustic signal further based on a position of the object obtained from the object information.

9. The apparatus of claim 1, wherein the object detector divides zones based on a distance from the driving path of the vehicle and groups objects in each of the zones, and
wherein the acoustic signal processor controls the frequency and the volume of the acoustic signal corresponding to objects based on the zones and applies a same weight to the frequency and the volume of the acoustic signal corresponding to objects in a same zone.

10. The apparatus of claim 1, further comprising a noise canceling unit, wherein the noise canceling unit receives a noise signal from at least one of the one or more sensors, generates a noise-canceling signal based on the noise signal, and transmits the noise-canceling signal to the acoustic signal processor, and wherein the acoustic signal processor transmits the acoustic signal including the noise-canceling signal.

11. The apparatus of claim 1, further comprising a vehicle warning unit, wherein the vehicle warning unit generates a warning signal based on detection of the object within a predetermined range from the vehicle and transmits the warning signal to at least one of the two or more speakers.

12. The apparatus of claim 1, further comprising a communication module to establish communication with a surrounding vehicle and transmit a warning signal to the surrounding vehicles when the surrounding vehicle is within a predetermined distance from the vehicle.

13. The apparatus of claim 1, further comprising a communication module to receive surrounding image data captured and surrounding sensing data captured by a surrounding vehicle, and
wherein the object detector detects the object using image data captured and sensing data captured by the vehicle and using the surrounding image data captured and the surrounding sensing data captured by a surrounding vehicle.

14. A method comprising:
obtaining vehicle information about a vehicle and calculate a driving path of the vehicle;
detecting one or more objects within a predetermined range from the vehicle or the driving path of the vehicle using one or more sensors mounted on the vehicle;
obtaining object information on each of the one or more objects;
calculating an angle of the object based on the object information;
controlling a frequency and a volume of an acoustic signal corresponding to the object based on the vehicle information and the object information;
generating a beamformed acoustic signal of the acoustic signal with direction information by controlling a delay and a level of the acoustic signal based on the angle of the object;
transmitting the beamformed acoustic signal to two or more speakers mounted on the vehicle; and
outputting the beamformed acoustic signal by controlling an amplitude based on a weight that is assigned to a respective one of the two or more speakers.

15. The method of claim 14, the vehicle information includes at least one of a speed, an acceleration, a location, and a rotation angle of a steering wheel of the vehicle.

16. The method of claim 14, further comprising:
receiving image data from an image sensor and sensing date from a non-image sensor; and
detecting the one or more objects based on at least one of a distance between each of the one or more objects and the vehicle, a distance between each of the one or more objects and the driving path of the vehicle, a speed, a shape, a size.

17. The method of claim 14, further comprising:
selecting one or more primary target objects based on a size or a shape of the object by excluding an object that is smaller than a predetermined size or different from a predetermined shape;
ranking the one or more primary objects based on proximity to the driving path of the vehicle, and
selecting a final target object that is closest to the vehicle among the one or more primary objects.

18. The method of claim 14, further comprising applying the weight to the frequency and the volume of the acoustic signal according to the distance information between the vehicle and each of the one or more objects.

19. The method of claim 18, wherein a greater weight is applied as the distance between the object and the vehicle or distance between each of the one or more objects and the driving path of the vehicle is closer.

20. The method of claim 14, further comprising:
dividing zones based on a distance from the driving path of the vehicle and groups the one or more objects in each of the zones; and
controlling the frequency and the volume of the acoustic signal corresponding to objects based on the zones and applies a same weight to the frequency and the volume of the acoustic signal corresponding to objects in a same zone.

* * * * *